US012786351B2

(12) United States Patent
Murata

(10) Patent No.: US 12,786,351 B2
(45) Date of Patent: Nov. 3, 2026

(54) SYSTEM AND METHOD FOR AUGMENTED VIEWS IN AN ONLINE MEETING

(71) Applicant: CANON U.S.A., INC., Melville, NY (US)

(72) Inventor: Shingo Murata, Mineola, NY (US)

(73) Assignee: CANON U.S.A., INC., Melville, NY (US)

( * ) Notice: Subject to any disclaimer, the term of this patent is extended or adjusted under 35 U.S.C. 154(b) by 127 days.

(21) Appl. No.: 18/721,437

(22) PCT Filed: Dec. 19, 2022

(86) PCT No.: PCT/US2022/081930
§ 371 (c)(1),
(2) Date: Jun. 18, 2024

(87) PCT Pub. No.: WO2023/122533
PCT Pub. Date: Jun. 29, 2023

(65) Prior Publication Data
US 2025/0063137 A1 Feb. 20, 2025

Related U.S. Application Data

(60) Provisional application No. 63/292,292, filed on Dec. 21, 2021.

(51) Int. Cl.
*H04N 7/15* (2006.01)

(52) U.S. Cl.
CPC ............. *H04N 7/152* (2013.01); *H04N 7/157* (2013.01)

(58) Field of Classification Search
CPC ............................... H04N 7/152; H04N 7/157
USPC ....................................................... 348/14.09
See application file for complete search history.

(56) References Cited

U.S. PATENT DOCUMENTS

| | | | | |
|---|---|---|---|---|
| 11,863,906 B2 * | 1/2024 | Han et al. | H04N 7/15 |
| 2005/0254982 A1 * | 11/2005 | Hoffman et al. | G06F 15/16 709/204 |
| 2016/0057391 A1 * | 2/2016 | Block et al. | H04N 7/155 |
| 2016/0134835 A1 * | 5/2016 | Desai | H04N 7/141 |
| 2016/0381109 A1 * | 12/2016 | Barnett et al. | H04L 65/601 |
| 2019/0190908 A1 * | 6/2019 | Shen et al. | H04N 7/15 |
| 2020/0045264 A1 * | 2/2020 | Galloway et al. | H04N 7/147 |
| 2020/0267349 A1 | 8/2020 | Garrido et al. | |
| 2024/0064271 A1 * | 2/2024 | Murata | H04N 7/152 |

FOREIGN PATENT DOCUMENTS

| | | | |
|---|---|---|---|
| EP | 3585050 A1 * | 12/2019 | H04N 7/15 |
| JP | 2020-091767 A | 6/2020 | |

* cited by examiner

*Primary Examiner* — William C Vaughn, Jr.
(74) *Attorney, Agent, or Firm* — Canon U.S.A., Inc. IP Division

(57) ABSTRACT

An apparatus is provided and connects to a first server. The apparatus receives a first video stream of a captured image captured by a first camera connected to the first server and receives a second video stream of a part of the captured image captured by the first camera. A participant ID is assigned to the first video stream and a virtual participant ID is assigned to the second video stream.

8 Claims, 11 Drawing Sheets

* Server system creates "(Virtual) IDs" as part of Metadata 1,2...7 while conventional Clients put "(Real) ID"
* Cloud Service recognizes Server system as Client(s)
* Cloud Service cannot distinguish between "Virtual" and "Real" IDs.

SYSTEM AND METHOD FOR AUGMENTED VIEWS IN AN ONLINE MEETING

CROSS-REFERENCE TO RELATED APPLICATION

This application is a National Phase application of International Patent Application No. PCT/US2022/081930 filed, Dec. 19, 2022, which claims the benefit of priority from U.S. Provisional Patent Application Ser. No. 63/292,292 filed on Dec. 21, 2021, both of which are incorporated by reference herein in their entirety.

BACKGROUND

Field

The present disclosure relates generally to bidirectional audio visual communication over a communication network.

Description of Related Art

Online meetings between users is known including when a group of individuals at one location are communicating remotely with one or more individuals not presently located at the one location. Current online meeting solutions provide one view per one person or one view from a particular camera. In the case of an online meeting between individuals at an office in a particular meeting room and remote users (e.g. users at home), remote users can see only fixed view of the office space.

SUMMARY

According to an aspect of the disclosure, an apparatus connects to a first server. The apparatus receives a first video stream of a captured image captured by a first camera connected to the first server and receives a second video stream of a part of the captured image captured by the first camera. A participant ID is assigned to the first video stream and a virtual participant ID is assigned to the second video stream.

In another embodiment, the apparatus connects to a second server. The apparatus receives a third video stream of a captured image captured by a second camera connected to the second server and receives a fourth video stream of a part of the captured image captured by the second camera. A participant ID is assigned to the third video stream and a virtual participant ID is assigned to the fourth video stream.

In another embodiment, the apparatus sets a meeting session. The first video stream is sent, via the meeting session, from the first server to the apparatus. The apparatus sets a virtual meeting session. The second video stream is sent, via the virtual meeting session, from the first server to the apparatus.

In another embodiment, the apparatus sets a meeting session, wherein the first video stream is sent, via the meeting session, from the first server to the apparatus.

The apparatus receives, from the second server, a connection request. The apparatus sets a meeting session with the second server and a virtual meeting session with the second server, in a case where a connection is permitted in response to the connection request. The third video stream is sent via the meeting session and the fourth video stream is sent via the virtual meeting session.

The apparatus forwards the received connection request to the first server. The meeting session with the second server and a virtual meeting session with the second server are set, in a case where a connection is permitted by the first server in response to the connection request.

In another embodiment, the apparatus is a cloud server that executes an online meeting software.

These and other objects, features, and advantages of the present disclosure will become apparent upon reading the following detailed description of exemplary embodiments of the present disclosure, when taken in conjunction with the appended drawings, and provided claims.

DESCRIPTION OF THE EMBODIMENTS

Figure 1:
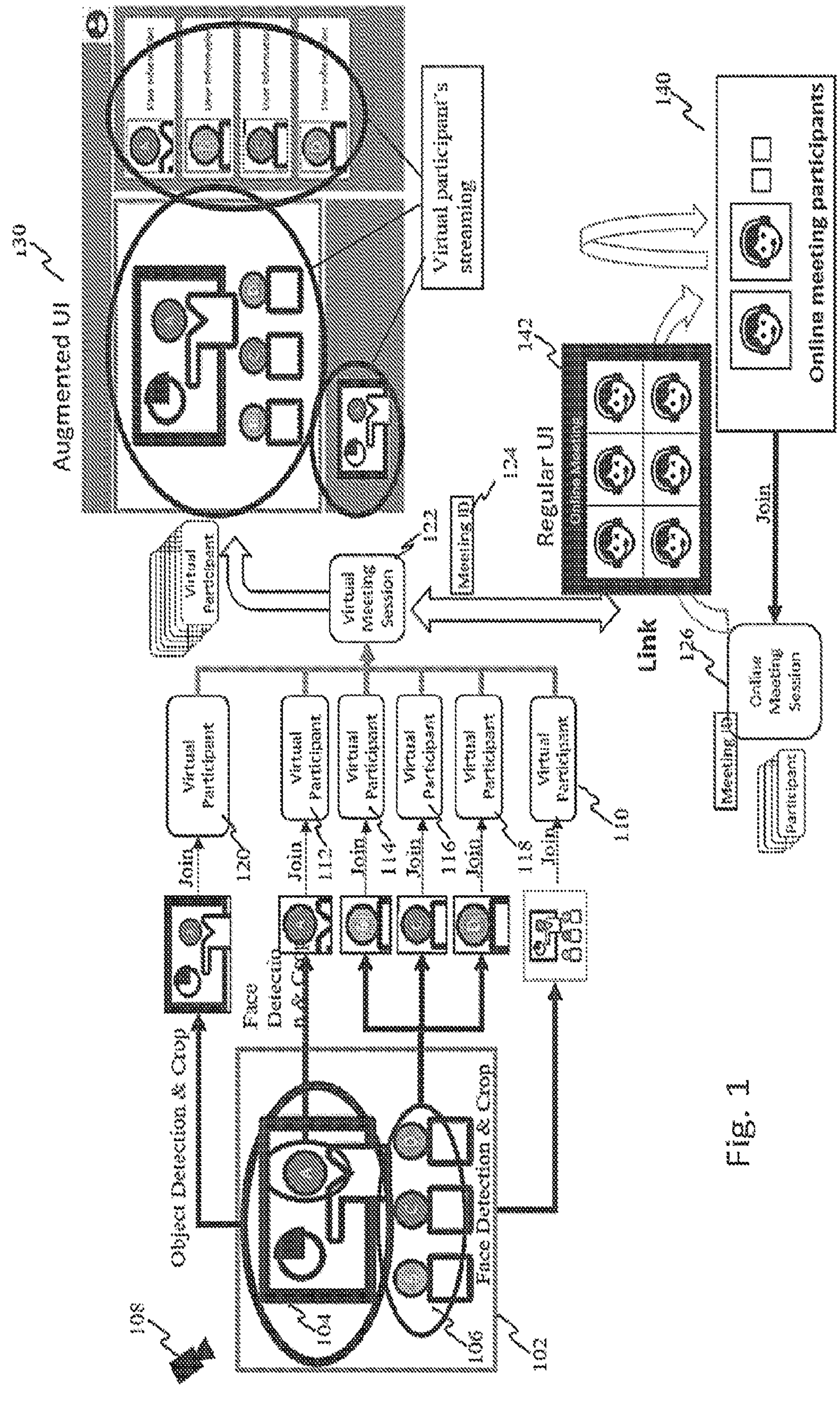
FIG. 1 is an illustrative view of an online meeting solution according to the present disclosure.

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

In real-time communication environment such as an online meeting, the online meeting application needs to reduce data traffic. As a result streaming video data from online meeting system sometimes provides video data at a lower image quality. In the case of the meeting between individuals at one location such as a meeting room in an office space and one or more remote individuals (e.g. users at home), those individuals who are remote users can see only zoom-out view or zoom-in view which focuses on one object. Further, current online meeting applications are typically one-way distribution from a source to those remote users that are not at the source from where the video stream is being captured. It is difficult to change the streaming video according to a participant's operation which means that the remote participants are forced to see a predefined view of an image capture device and participants are not able to focus on what they want to see at the location from where the video stream is being captures. For these reasons, the meeting participants (remote users) are not able to see what they want to look at.

The following disclosure illustrates an online meeting application that enables impromptu collaboration between users who may be physically located at one location such as an office and one or more individuals who are remotely located. The system advantageously assigns, manages and uses different identifiers in order to facilitate communication in this environment that allows remote users to have enhanced control over the field of view captured at the one location by an image capture device. As such, the remote user is able to view the one location according to the remote user definition or selection. This is accomplished by assigning user id information (virtual participant ID/Virtual Webcam ID) to each of a video captured by a camera at a meeting space and one or more cropped videos cropped from the captured video to enable an online meeting system to distribute these videos as well as videos of real participants.

Multiple virtual ID (virtual participant ID/Virtual Webcam ID) may be assigned to one person or one object. For example, a video stream of a hand of a person and a video stream of a face of the same person may have original virtual IDs respectively. For example, a first virtual participant ID "User A_hand" and a second virtual participant ID "User A_face" may be assigned to parts of the user A. In this way, a user or a system can receive respective video stream of each part of a person or an object. Then a user or a system can select a video stream of a preferable part of a person or an object.

Alternatively, one virtual ID (virtual participant ID/Virtual Webcam ID) may be assigned to multiple people or multiple objects. For example, one virtual ID (virtual group ID) may be assigned to a video image including image of person A and person B. In addition, the virtual ID may be generated hierarchically. For example, a first virtual ID is assigned to a video stream of person A and a second virtual ID is assigned to a video stream of person B and a third virtual ID (group ID) is assigned to a video steam of person A and B. The video stream to which group ID is assigned may contain video images of two or more objects. Alternatively, the video stream to which group ID is assigned may contain video images of a person and an object. By assigning one virtual ID to a multiple entities (people or objects), a user or a system can select a video stream of a preferable group of people or objects.

In addition, a virtual ID may be assigned to a person, an object or a device (Webcam ID) at which a user pointed with his finger in a conference room.

According to the present disclosure as shown in FIG. 1, an online meeting application executing on a server (FIG. 2) performs recognition processing to identify one or more different types of objects and one or more different users within an image stream captured by a single image capture device such as a camera. The one or more different types of objects includes but is not limited to a whiteboard, a person, a document, a notebook. In other embodiments, the object detection can automatically detect any object that includes handwriting or typed content, one or more images, a display of a computing device (e.g. laptop, tablet, smartphone, etc.). The recognition processing can further include executing a face detection algorithm that identifies one or more users within an image capture area. This detection occurs prior to the meeting and once the one or more objects within the captured video streams are identified, those objects are cropped before streaming the video data from the camera to online meeting system. The online meeting application creates streaming video objects as virtual webcam feeds to feed the individual cropped video streams to online meeting application.

As shown in FIG. 1, an image capture area 102 is shown that includes one or more objects 104 and one or more people 106 that are selectively captured by an image capture device 108. As noted above the one or more objects include a writing surface such as a whiteboard. Additionally, as will be described later, the one or more objects is any object that is not a human user that is positioned within the image capture area. The users 106 are denoted in FIG. 1 as User A, User B, User C and User D but this is not limiting. Any number of users 106 may be present within the image capture area 102.

In one embodiment, recognition processing occurs prior to the meeting and once the one or more objects within the captured video streams are identified, those objects are cropped before streaming video data from camera to online meeting system. In another embodiment, a meeting can be initiated and recognition processing is continually performed based on newly detected presence of users and objects that enter and/or exit the image capture area.

Figure 2:
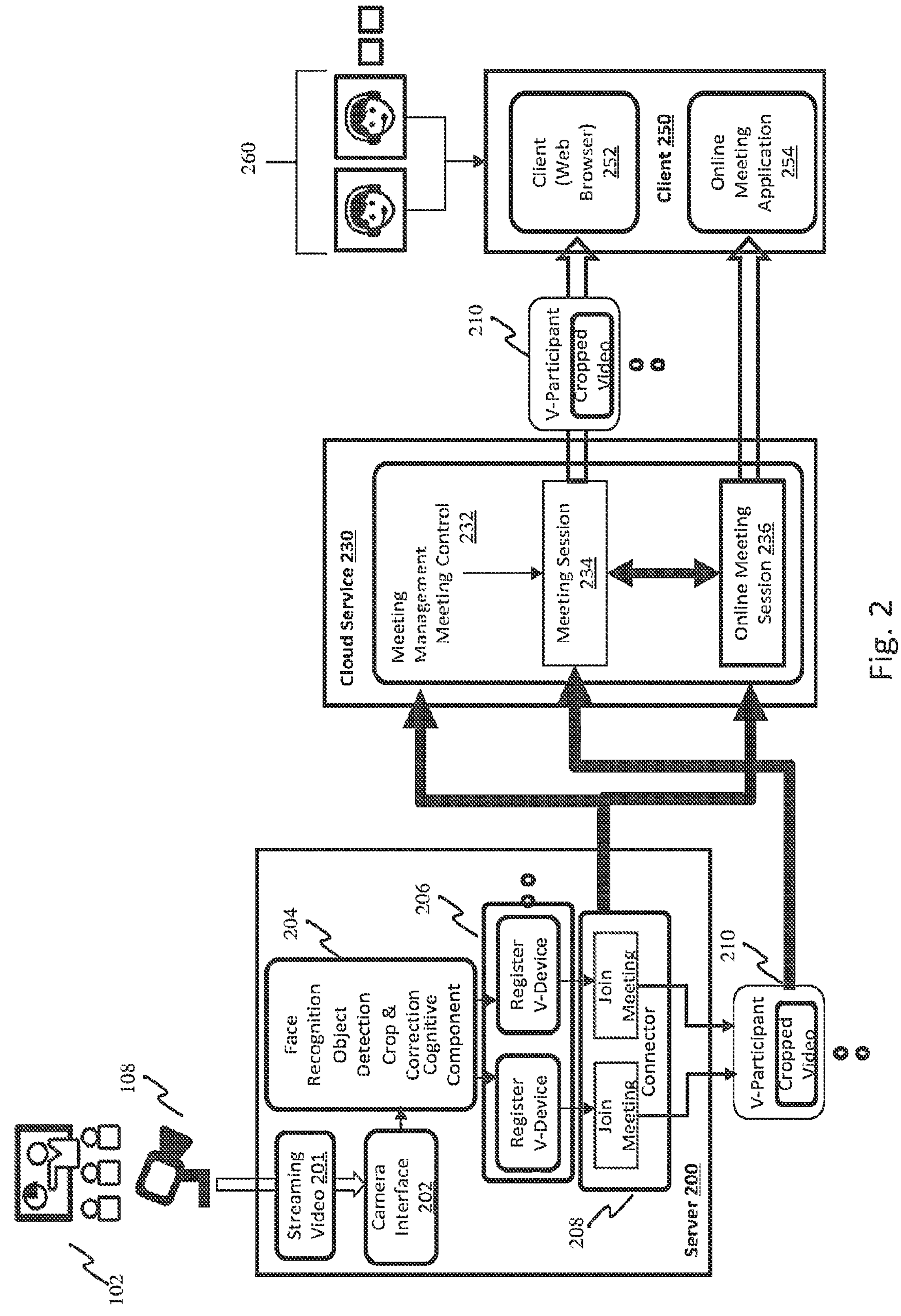
FIG. 2 is a block diagram of an online meeting solution according to the present disclosure.

The meeting application executing on the server in FIG. 2, perform video image cropping operations to crop predetermined regions based on the results of the recognition processing within the video data being captured by the image capture device 108. These cropped regions are extracted by the meeting application executing on a server and controlled to be a source for individual virtual participant streams as shown in FIG. 1. Accordingly the cropped streaming video regions created by the meeting application represent respective virtual video feeds that are provided as inputs to feed and transmit the individual cropped video streams to online meeting system.

The online meeting application obtains these virtual video feeds (e.g. virtual webcams) and causes the individual virtual video to join online meeting as virtual participants. As shown in FIG. 1, the image capture device 108 performed recognition processing and has identified six regions within the capture area representing either users or objects that were recognized during performance of recognition processing and which are cropped from the frame representing the image capture area 102 into individual regions each of which is provided as a separate virtual video stream. A first video stream 110 represents the entire image capture region 102 captured by the image capture device 108 and provides an in-room complete view of every user and object within the field of view of the image capture device 108 in the image capture area 102. The first virtual video stream 110 is assigned a first virtual identifier (in a manner discussed below) to uniquely identify the first virtual video stream 110 so that the video data in the first virtual video stream can be processed by the remote user interface in a manner discussed below. The result of the recognition processing indicates that five regions within the image capture area contain either an object or user that has been recognized by a recognition engine that is trained to identify items within a video frame.

Recognition processing performed on the video data captured by the image capture device 108 indicates that User A, User B, User C and User D have been recognized. In one embodiment, images of the users are captured and compared to an image repository that is linked with user names and identities and has resulted in these users being recognized. Based on this recognition, the meeting application forms bounding boxes around the recognized faces of Users A, B, C and D and extracts video data contained within each respective bounding box by cropping and assigns virtual video stream identifiers to each cropped region. Second virtual video stream 112 is associated with User A. Third virtual video stream 114 is associated with User B. Fourth virtual video stream 116 is associated with User C and fifth virtual video stream 118 is associated with User D.

Recognition processing performed by the meeting application executing on the server in FIG. 2 also recognizes an object corresponding to a writing surface 104. In one embodiment, the recognition processing recognizes this object based on a preset position information that is input into the meeting application and which represents, on a pixel by pixel location within the image capture area 102 where the object to be recognized is positioned. In another embodiment, a recognition engine has been trained to recognized a plurality of different types of objects in order to automatically identify various objects within a frame. In certain embodiments, the recognition engine may be trained to recognize objects such as books or papers, including text written thereon, which can be extracted from the video data stream captured by the image capture device 108. In this exemplary embodiment, the recognition processing identifies the writing surface 104 and extracts video data from the region of the image capture area corresponding to the recognized object 104 and associates this information with a sixth virtual video stream 120.

To effectively separate virtual participants (cropped objects) from real participants, the meeting application initiates a virtual meeting session 122 having a meeting identifier 124 and associates that virtual meeting session with a current online meeting session 126. The current online meeting controls the backend meeting processing including audio communication between participants that have joined the current online meeting session 126. In one embodiment, the online meeting session 126 is initiated using a control application such as MICROSOFT TEAMS® or other similar type of application whereby each of Users A-d have joined as meeting participants. In one embodiment, the meeting application that generates the virtual meeting session identifier 124 and the control application that controls the current online meeting session are separate applications. The virtual meeting session 122 includes a virtual meeting identifier that enables remote access to the virtual meeting session. In one embodiment, the current online meeting session 126 enables all online participants 140 to join and also includes a current online meeting session user interface 142 that is accessible to viewable by participants 140 as well as the virtual meeting session 122.

The virtual meeting identifier links to information identifying all virtual video streams 110-120 and joins the current online meeting session 126 as a participant using the virtual meeting session identifier 124 initiated by the meeting application executing on server in FIG. 2. In another embodiment, instead of staring another virtual meeting session, our application may be able to set a virtual flag to participant information to distinguish virtual participants from real participants. Using these virtual webcam feed participants, all users (meeting participants) are able to see cropped video via online meeting system. Most importantly, users are able to see the detail of persons or objects in the office by selecting a virtual participant.

The various virtual video streams 110-120 associated with the virtual meeting session 122 are communicated to one or more remote users that are able to display an augmented user interface 130 that enables display of one or more of the virtual video data streams 110 in different regions of the user interface. The virtual meeting session 124 includes an identifier that is selectively accessible using a web browser executing on a computing device such as a laptop, desktop, smartphone or tablet computer. The virtual meeting session identifier provides a series of individual video sources that can be rendered within a web browser user interface and, as will be discussed hereinafter, enable a user to selectively choose from the plurality of virtual video streams 110-120 to be displayed in defined locations within the user interface being rendered on the remote computing device. In in the exemplary view shown in FIG. 1, the user interface 130 includes three display regions that each can display one or more of the virtual video data streams 110-120 associated with the virtual meeting identifier 122 that is used to obtain access thereto. In this example one display region displays the first virtual video stream 110 representing the entire image capture area. A second different display region displays the sixth virtual video data stream 120 representing the recognized object being the writing surface 104 and a third display region different from the first and second display regions displays the second through fourth video data streams associated with each of the respective Users A-D. The position of the display regions and their respective contents is merely exemplary and remote user may selectively change the positions of the video data streams received based on access using the virtual meeting identifier 122.

The system according to the present disclosure is also illustrated in FIG. 2 and includes one or more servers 200, one or more cloud service applications 230 and one or more client applications executing on a client computing device 250 such as a laptop, tablet, computer, smartphone or the like.

The system includes one or more servers 200 that connects with camera 108 in a particular physical location such as an office or meeting room to capture an image capture area 102. The server 200 controls the camera 108 to continually capture video images 201 within the predetermined field of view of the camera 108. The camera 108 is connected to the server 200 via a streaming interface 202 that receives video data 201 in a video data format. The streaming interface 202 may include a video capture card that is coupled to the camera 108 via a connector cable compatible with the HDMI standard. In another embodiment, the streaming interface 202 may be a network connector that is coupled to a network and received packetized video data 201. The server 200 includes a plurality of applications that perform the functionality described herein both in FIG. 1 and hereinafter. includes an application that detects objects as noted above such as people and/or whiteboards. The server 200 includes an video processing application 204 application that crops and corrects image data that is associated with the one or more detected objects and assign the cropped regions virtual video data stream identifiers. The video processing application assigns virtual identifiers having a defined format that denotes its source, type and unique ID.

The server also operates as a meeting connector 208 to associate each of the cropped video regions from within a single image frame with a virtual video stream identifier from Table 2 join as part of the virtual meeting which also can be joined as part of the current online meeting.

The system also includes one or more cloud services 230 to manage online meeting sessions and virtual meeting sessions. An exemplary cloud service is an online meeting application such MICROSOFT TEAMS, ZOOM and WEBEX and the like. The application executing on the server acts as an input to the online meeting application. More specifically, the registered virtual participant identifier is provided from the connector 208 as input a meeting management control application 232 and concurrently to the current online meeting session 236. The video data 210 which represents one or more virtual video data streams that are associated with respective identifiers from each of the cropped regions forming the virtual video data streams are provided to the virtual meeting session 234.

The system further includes one or more client applications executing on a client computing device 250 that allows each remote participant 260 to access the online meeting application 254 and receive and interact via a web browsing application 252 with the different virtual video data streams 210 captured by the camera 108 connected to the server 200 via the virtual meeting session using the presently disclosed meeting application. The client connects with Cloud Service 230 and enable users to operate any functions related to online meeting 252. Client device 250 can obtain streaming videos representing one or more of the virtual video data streams 210 from Cloud Service 230 and display them in a user interface on a display of the client device 210. The client device 250 would have two user interfaces, one for an online meeting 254 such as the 3rd party meeting application (e.g. TEAMS) and the other is for the virtual online meeting virtual online meeting via the web browser 252.

In exemplary operation, a User Interface (UI) generator determines the display layout based on the Display Name received from the cloud service. The Display Name is a name of each participant displayed in a video conferencing platform that the User Interface is displayed in. After logging-in, Client A identifies, from video streams received from the cloud service, a video stream whose type is "Room" and displays it. When User A selects "white board view mode" the Client A identifies a video stream whose type is "white board" and display it instead of the video stream whose type is "Room". When User A selects "Two view mode", the Client A identifies a video stream whose type is "Room" and display it in a large region of the display screen and also identifies a video stream whose type is "Whiteboard" and displays it in a smaller region of the display screen. The videos in the large region and the smaller region can be alternated with each other via the use of a switching button.

Figure 3:
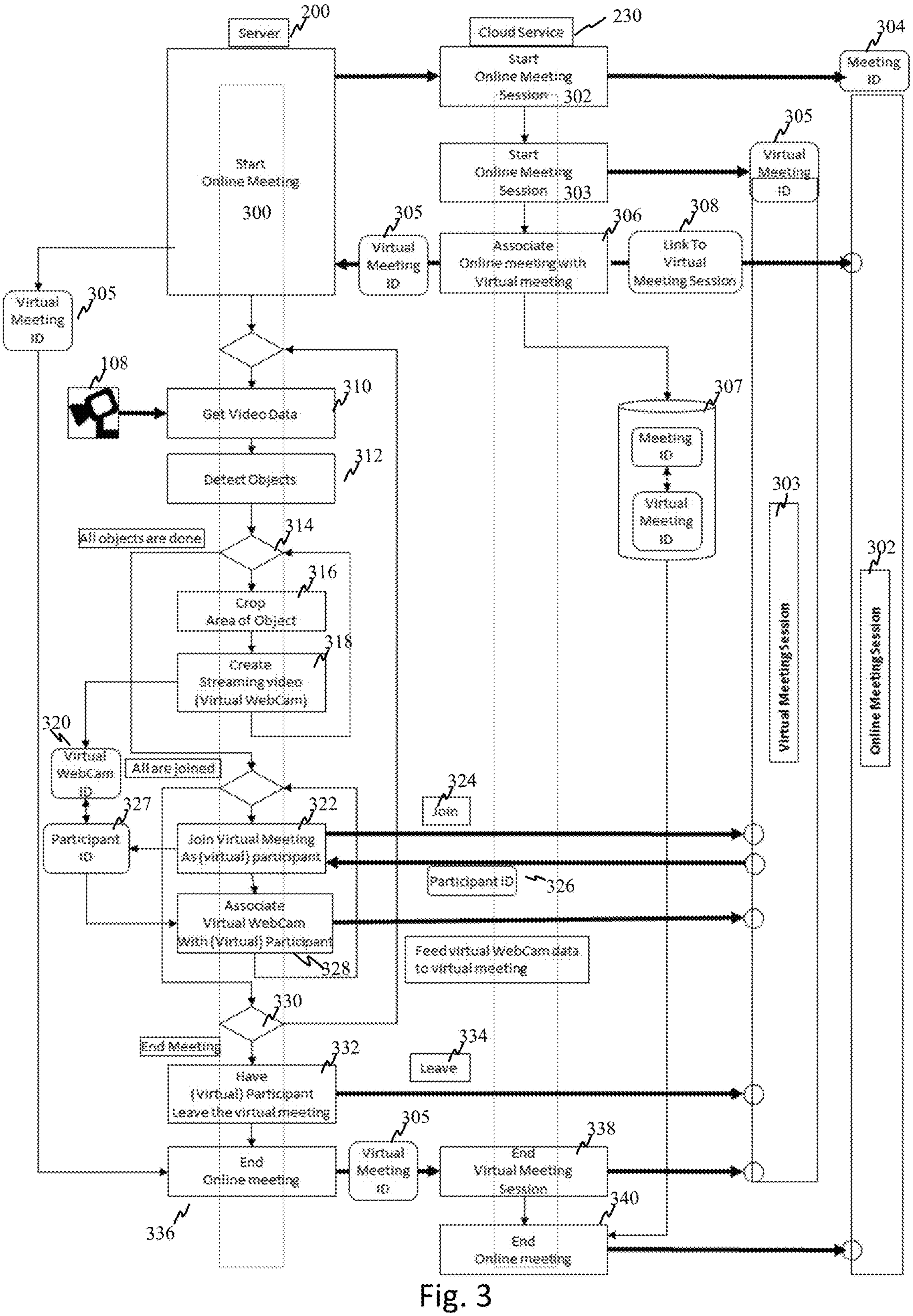
FIG. 3 is a flow diagram illustrating exemplary operation of the online meeting solution according to the present disclosure.

FIG. 3 is a flow diagram that details the data flow and algorithmic operations described herein with respect to the present disclosure. The Server 200 receives a meeting start request 300 from users at a predetermined location such as an office. The server 200 sends the request 300 to the Cloud Service 230. In one embodiment, the meeting request may be initiated by users sending a start meet command from a user interface coupled to the server 200 or via gesture command recognized by camera 108 coupled to the server 200 Next, the Cloud Service 230 starts a first online meeting session 302. This first online meeting session 302 would be control meeting application session such as one created by TEAMS. Once the online meeting session starts, the Cloud Service obtains a "meeting id" 304. With an integration with a control meeting application, a "meeting id" 304 is issued by the control meeting application. Without an integration, the "meeting id" 304 is generated by the Server 200.

After starting the first online meeting session 302, the Cloud Service 230 starts a second meeting session 303 representing a virtual meeting session. Once the virtual meeting session 303 starts, the Cloud Service 230 obtains a "virtual meeting id" 305. A "virtual meeting id" 305 is generated by the Server 200. The Cloud Service 230 starts the second (virtual) meeting session 303 in order to provide information to be used to generate a separate UI for the augmented office view from a user interface associated with the control meeting session 302. It should be noted that the Cloud Service 230 may obtain the "virtual meeting id" 305 before getting or generating the "meeting id" 304 explained above.

The Cloud Service 230 performs an association step 306 that associates the "meeting id" 304 with the "virtual meeting id" 305 and stores them in a database 307. The Cloud Service 230 sends the "virtual meeting id" 305 to the Server 200. The Server keeps the "virtual meeting id" in its memory or database. Additionally, after associated the "meeting id" 304 with the "virtual meeting id" 305, a link 308 to the virtual meeting session 303 is provided to the online meeting session 302 created by the control meeting application such that users connected to the online meeting session 302 via the control meeting application can directly link to and access the virtual meeting session 303 by selecting the link 308 which causes a web browser application to open on the client device as discussed above.

Upon starting both the first meeting session 302 and the second, virtual meeting session 303, the server 200 controls the camera 108 to begin capturing a streaming video data 310 from the camera 108. In one embodiment, the camera is a network camera. In another embodiment, the camera is any dedicated camera having a field of view of substantially the entire predetermined location such as the meeting room in the office.

The server 200 performs recognition processing 312 to detect one or more objects from within the frames of video data 310 captured by the camera 108. Recognition processing 312 identifies one or more predetermined objects such as a person, a whiteboard, a display screen and a document. These are merely exemplary and any object may be set as a one of the predefined objects detected during object detection.

Decision processing for each object detection begins at 314 where the server 200 queries whether there are detected objects 312 that have not been further processed and from which a virtual video data streams have not yet been made. The iterative processing for each detected object is as follows. In 316, the server performs image processing to crop the detected object from the video data 310 and in 318, creates a new (another) streaming video object such as virtual video data stream or virtual image feed of the video data within the cropped region. The virtual video data stream object is assigned a "virtual video data stream id" 320 as noted in Tables 1 and 2 which generated by the Server which is stored in memory or in a database. The "virtual webcam id" is related to the detected object and its streaming video.

After creating virtual objects based on the object detection in 316-320, and after it is determined at 314 that the video data stream 310 contains no further recognized objects or people, the server performs the following processing for each virtual object detected and that has a virtual video data stream identifier 320 associated therewith.

Using the respective virtual video data stream identifiers 320, the server 200 cause the respective detected objects to join 322 the virtual meeting session 305 as a virtual participant via a join request 324 transmitted from the server 200 to the cloud service 320. Once the detected object joins the virtual meeting session 303, the server 200 obtains a "virtual participant id" 326 from the Cloud Service 230. The Cloud Service generates a "(virtual) participant id" 326 when someone (or something) joins the virtual meeting session 303. The server causes the participant ID 326 to be stored 327 in in memory or database The server performs association processing 328 and associates the "(virtual) participant id" 326 with the "virtual video data stream id" 320 and feeds, as input, the associated virtual video data stream 320 to the virtual meeting session 303 as a virtual participant stream video. One or more videos associated with the virtual meeting session are provided to Clients in response to a request received from a client application or device as will be discussed above in FIG. 1 and again in FIGS. 4 and 5A and 5B. The processing associated with steps 322-328 are repeated for each virtual video data stream ID 320.

Meeting ending processing is performed beginning at 330 which determines if there has been a meeting end request received. If there has been no meeting end request, processing revers back to 310. In a case where an end meeting request has been received, the server performs disconnection processing 332 which generates a disconnection (e.g. leave meeting) message 334 that is transmitted to the virtual meeting session 303 causing all participants video data streams to leave the virtual meeting session 303 resulting in all of the video streaming to stop. Thereafter, end processing 336 is performed whereby the server 200 sends "virtual meeting id" 305 and an end-meeting request 338 to the Cloud Service 230. The Cloud Service obtains the "online meeting id" 304 related to the "virtual meeting id" 305 and the Cloud Service ends both the virtual meeting sessions 303 via first end processing 338 and the control meeting session via second end processing 340.

In another embodiment, the ability to have a second meeting room join a current meeting room is contemplated. To achieve this, the meeting ID 304 may be utilized to invite one or more participants in the second online meeting room to the online meeting session 302. The second meeting room may have its own instance of the online meeting application controlling the operations in the second meeting room. For example, a first online meeting is held by a first server at a first location and second online meeting is held by a second server at a second location. The meeting ID 304 generated by the first server 200 may be communicated to the second server. More specifically, a first participant of the first online meeting can communicate the meeting ID 304 to a second participant who is participating in the second online meeting via email (or other real-time communication application) and then the second participant may input (or select) the received meeting ID 302, the execution of which is performed by the second server. Alternatively, the first server may send the meeting ID 304 to the second server in accordance with an instruction by the first participant and the second server may receive the meeting ID 304 from the first server.

The second sever joins to the cloud service 230 using the received meeting ID 304. Then the second server receives virtual meeting ID 305 associated with the meeting ID 302 from the cloud server 230. Alternatively, the second server may receive the virtual meeting ID 305 from the first server 200 together with the meeting ID 302. In another embodiment, the second server may generate new virtual meeting ID and send it to the cloud service 230 and the cloud service 230 may associate the second server virtual meeting ID to the meeting ID 302. In this case the virtual meeting ID 305 generated by the first server and the virtual meeting ID generated by the second server are associated with the meeting ID 304.

If a virtual participant ID or Virtual Webcam ID is generated by the second server, the virtual participant having the generated ID joins to the virtual meeting having the virtual meeting ID associated with the meeting ID. In this way, the second server and video streams from the second server are connected to a meeting ID that the first server and video streams from the first server are connected. By connecting the first server and the second server to the same meeting ID, the participants (including real participants and participants having virtual participant ID) can join to a meeting held by the first server.

The cloud service 230 or the first server 200 may require a confirmation by a user for allowing the second server join in the meeting if the cloud service receives the meeting ID from the second server. Alternatively, the confirmation may be performed automatically. For example, the cloud service 230 or the first server 200 may require an input of PIN code or authentication. For example, the cloud service 230 or the first server 200 stores a secret PIN code in advance and if the same PIN code is received from the second server, the cloud service 230 allows the second server to join in the meeting. Alternatively, the cloud service 230 or the first server 200 may perform authentication based on an identifier associated with the second server such as, but not limited to, IP address, MAC address or other unique ID of the second server or unique ID of a participant of the meeting held by the second server. A detailed explanation of the join of the second server to the meeting will be described in FIG. 10.

Figure 4:
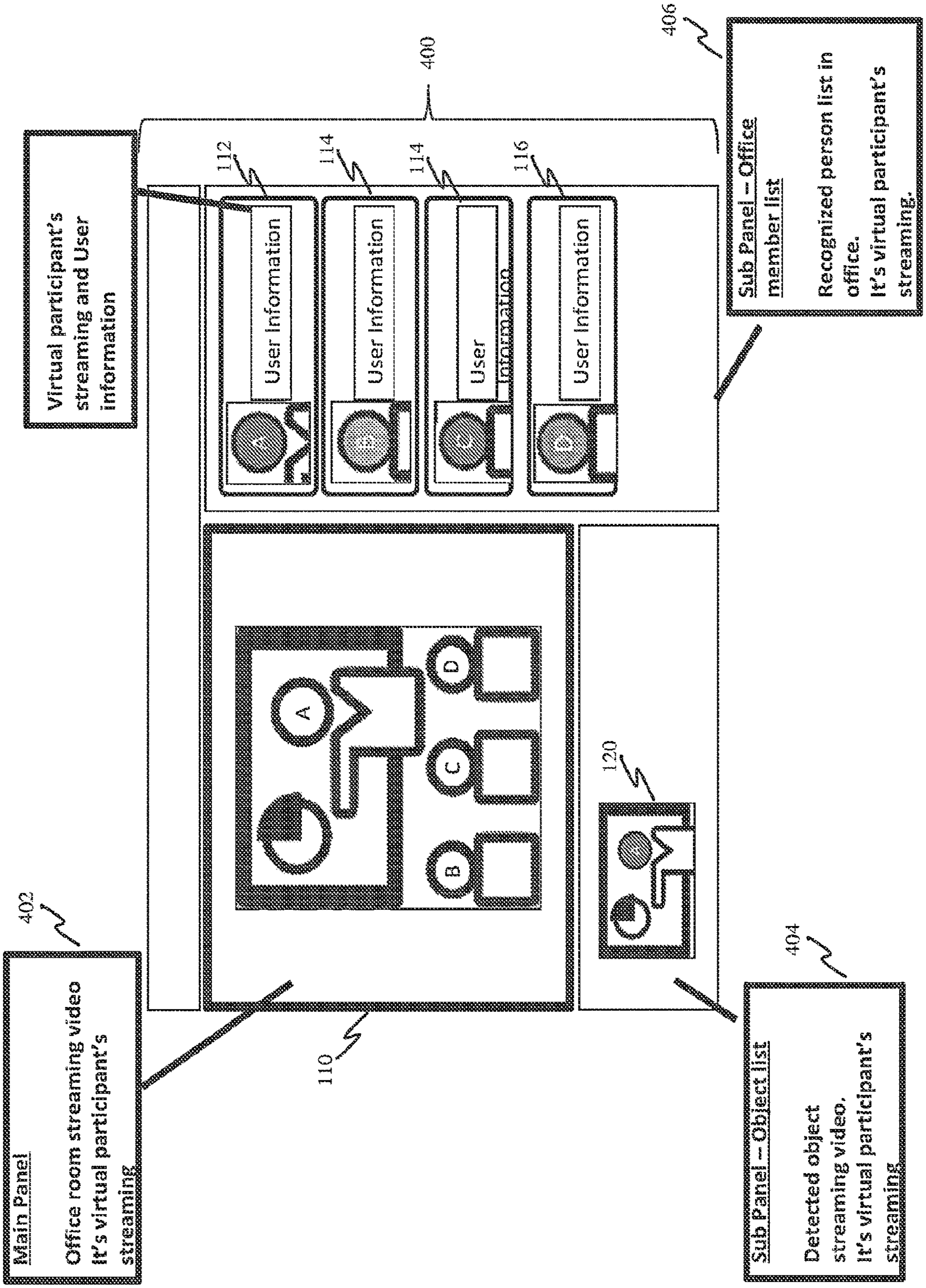
FIG. 4 is an exemplary user interface display for a remote participant using the online meeting solution according to the present disclosure.
Figure 5A:
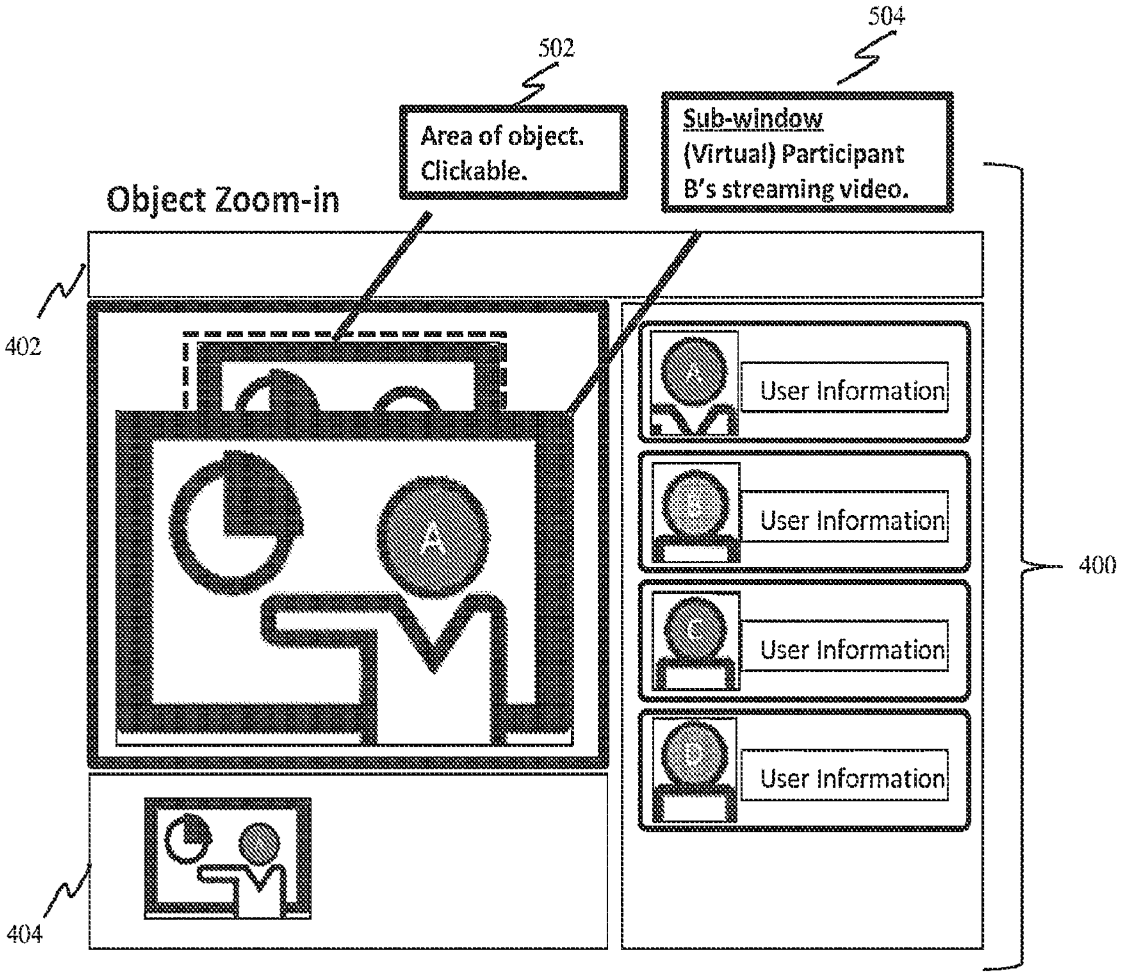
FIG. 5A-5B illustrate exemplary user interface displays for a remote participant using the online meeting solution according to the present disclosure.
Figure 5B:
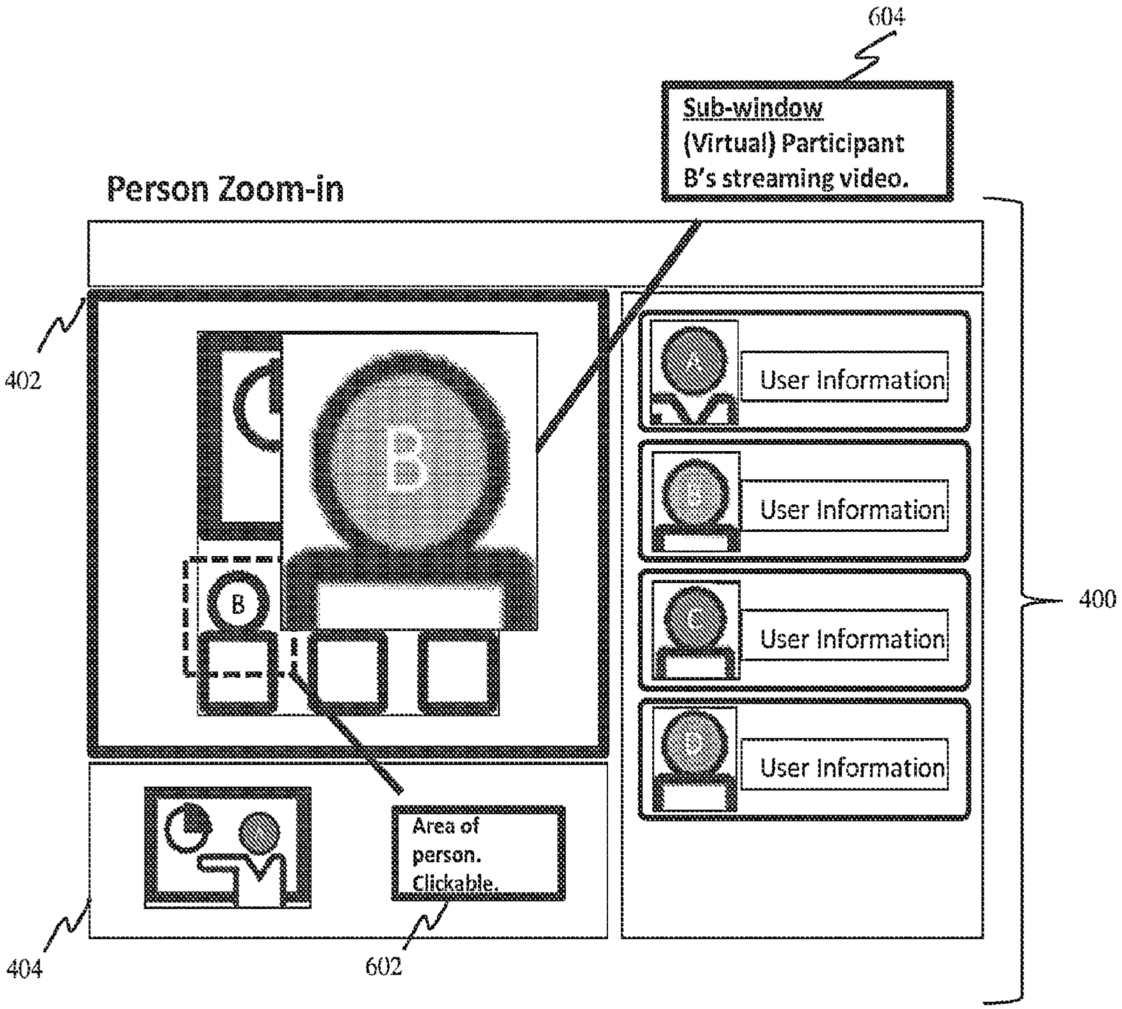

FIGS. 4 and 5A and 5B are exemplary user interfaces displayed by the client device that can participate in the online meeting. Once the control meeting session 302 starts, users join the control meeting session using a dedicated control meeting application having its own dedicated user interface. Users join the virtual meeting session 303 via a web browsing application executing on the client device. The cloud service 230 has already associated the online meeting session with the virtual meeting session so the online meeting session has a link to the virtual meeting session. Once a user selects the link to the virtual meeting, the Client UI is opened. The user is able to join the virtual meeting session via the Client UI and the Client sends a request for one or more virtual video data streams (e.g. a cropped video representing a video of a partial region) to the Cloud Service 230, and the Client displays the one or more virtual video data streams received from the Cloud Service 230.

In the virtual meeting session 303 viewable via the web browser executing on the client device, virtual video data streams representing detected objects or detected people streaming as a (virtual) participant video. The user interface within the web browser executing on the client device provides users functionalities to switch the streaming video on the screen so users are able to change views between all of the virtual video streams that are generated based on recognition processing above. It should be noted that the user interface enables the client device to be able to reproduce one or more videos each associated with the participant id and one or more videos each associated with the virtual participant id after termination of the online meeting session. In another embodiment, the server may store each video and provides one in response to a request from the Client.

In another embodiment, each participant id is associated with security level information, and one or more videos associated with the virtual video data stream ids (or virtual participant ids) are only provided to client devices that have corresponding to security level information having a higher security level than the predetermined level. Alternatively, the sever 200 may be able to determine if the video associated with the virtual video data stream id is to be provided based on a comparison between the security level of a Client (or client device) requesting the virtual video data stream and the security level of attributed to the video data stream.

As another embodiment, the Cloud Service may provide position information indicating a position of the cropped region within the video of the meeting space such that the Client displays the cropped when the user indicates a region, on the video of the meeting space, defined by the position information.

FIG. 4 illustrates a user interface 400 caused to be displayed on a client device via a web browser that uses the virtual meeting ID link to join the virtual meeting session. The user interface 400 includes a plurality of display sections that can selective display respective ones of the virtual video data streams corresponding to objects and/or persons detected during the recognition processing performed on the video data as described above. The user interface generator makes use of the virtual video data stream ID in is associated format to generate the user interfaces being displayed on the client device.

The user interface generator causes the user interface 400 to be generated and includes a first display region 402, a second display region 404 and a third display region 406. In this exemplary embodiment, the first display region 402 is controlled to display virtual video data stream 110 corresponding to the full image capture area is being displayed. The user interface generator obtains the virtual video data stream ID and uses that information to position the video data stream within the user interface 400. In the second display region 404, one or more icons representing one or more detected objects able to be selected is displayed. As shown herein, an icon corresponding to the virtual video data stream identifier 120 of the writing surface object 104 is displayed. A user can select the icon causing the user interface generator to request the video stream of the whiteboard and cause that video data stream to be displayed within the first display region 402 and causing the previously displayed video data stream to stop being displayed and present the previous video data stream within the second display region 404. In other words, video data streams swap positions within the user interface 400 which allows the user to selectively determine which of the plurality of virtual video data streams are to be viewed at a given time. The user interface 400 includes a third display region 406 that displays user identification icons corresponding to the one or more users recognized as part of the user recognition processing described above. As shown herein, the icons correspond to the virtual video data streams 112, 114, 116 and 118 from FIG. 1. The icons present information about each of the users that may be obtained using the {name} information in the virtual video data stream identifier associated with each respective virtual video data stream. Moreover, the {type} field in the identifier is used by the user interface generator when positioning one or more of the virtual video data streams or user selectable icons that represent virtual video data streams.

In one embodiment, the icons in the third display region are selectable and cause the corresponding virtual video data stream of that user to be displayed in the first display region. In another embodiment, only at a particular time or based on a particular designation associated with a respective user can the icons in the third display region be selected to be shown in the first display region 402. For example, in an instance where one of the respective users is identified as a presenter or speaker would that users icon be selectable causing the display of the virtual video data stream of the user in the first display region 402.

FIGS. 5A & 5B illustrate additional embodiments of the user interface 400 shown in FIG. 4. The user interface 400 includes common elements, the description of which need not be repeated as the description of FIG. 4. As such, only the differently labeled elements and their control operation will be discussed.

In FIG. 5A, in the main display region 402 of the user interface 400. The virtual video data stream 110 is controlled to be displayed. More specifically, the user interface generator uses the first virtual video data stream identifier as the source for displaying the video data stream representing the entire image capture area 102 being captured by the image capture device 108 in FIG. 1. From within this view being displayed a selection indicator 502 (illustrated by the dashed lines in FIG. 5A) is made visible to the remote user. The selection indicator 502 indicates that the area within the selection indicator represents a region of interest 504 including an object (or person) that was recognized during recognition processing that has its own virtual video data stream and associated virtual video data stream identifier. This allows for video data within the selection indicator 502 to be displayed. A user may select the section indicator 502 and cause the video data stream associated therewith to be displayed within the first display region 402 as selected video data 504 that provides a zoomed-in version of the information within the selection indicator 502. In doing so, the user interface 402 receives a selection instruction via user input at the user interface of the selection icon. The user interface generator obtains the virtual video data stream ID associated with the selection indicator 502 and causes the video data associated with the respective virtual video data stream ID to be displayed within the first display region. More specifically, the virtual video data had been joined to the virtual meeting session as a virtual participant and the selection of the selection indicator 502 causes the video data associated with the participant ID corresponding to the virtual video data is caused to be displayed in the first display region 502. As shown herein, the selected virtual video data is superimposed over the video data from which the selection had been made. However, this is for purposes of example only and, in some embodiments, selection causes the selected virtual video data to replace the virtual video data stream from which the selection was made in the first region with the selected virtual video data and cause an icon to be displayed in the second display region 404 that enables the user to reselect the virtual video data from which the selection has been made. FIG. 5B illustrates the same processing described in FIG. 5A with the exception the selection indicator 602 identifies a region of interest representing User B and the selection thereof causes the virtual video data stream of the participant ID associated with User B to be displayed within the first display region as the region of interest video data stream 604.

Figure 6:
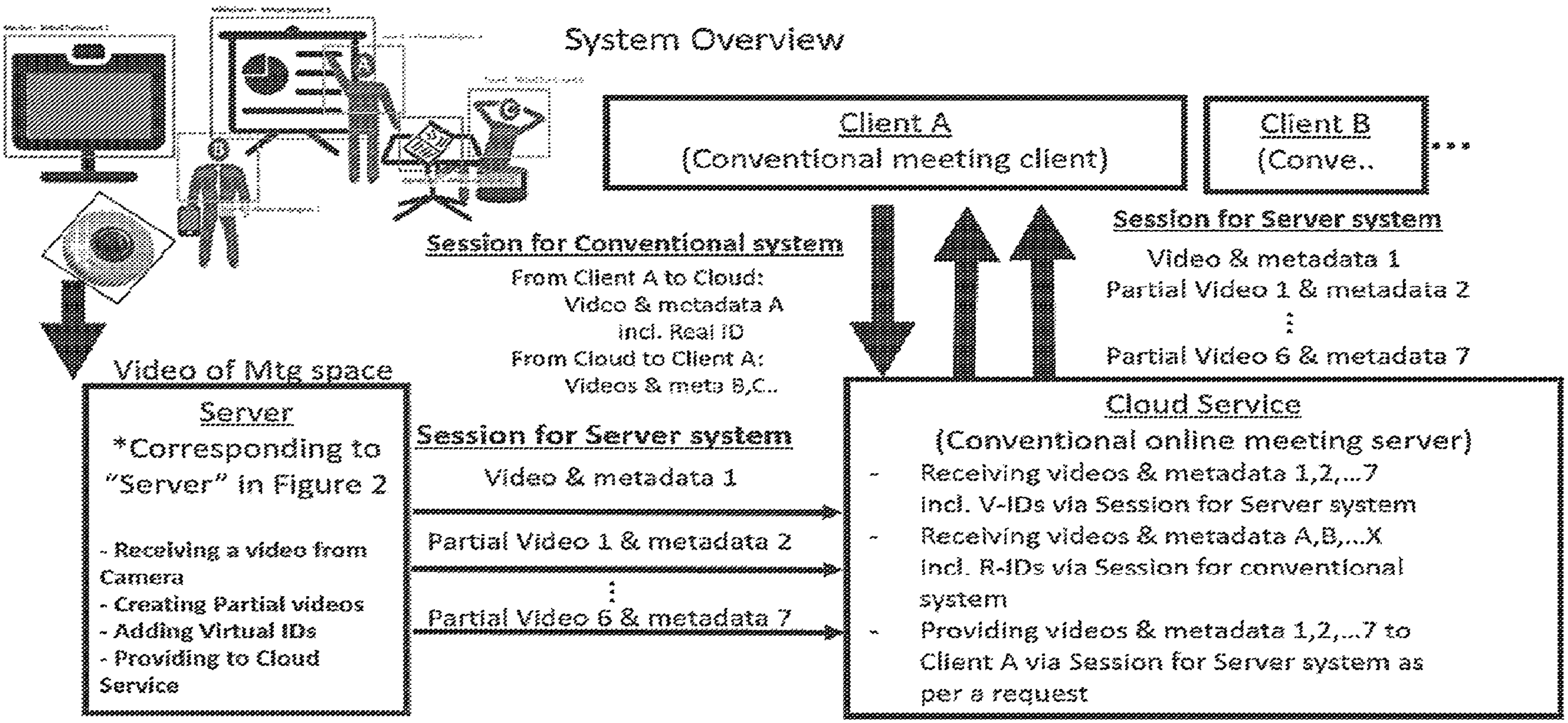
FIG. 6 is an illustrative view of the online meeting solution according to the present disclosure.

According to the present disclosure, as shown in FIG. 6, online cloud meeting systems do not receive and process any videos without a participant ID. Accordingly, the server according the present disclosure provides a function that adds Participant IDs to any video source that does not have a Participant ID such that the online meeting system can process videos that traditionally do not include Participant IDs. The server adds unique Virtual IDs to one or more video streams cropped from the video captured at the location. It should be understood that these partial streams extracted via a cropping process are identified both as virtual video data stream and video data streams and thus these terms are interchangeably used through the present disclosure and should be understood to mean the same thing. These partial video streams are able to be recognized by the online meeting system as videos for an online meeting. The online meeting system uses IDs to recognize the received videos as being related to, or otherwise associated with a particular online meeting system to identify each individual video. As such these partial video streams are individual video data streams that are "virtual video data streams". When the online meeting system transmits the video data streams, it uses IDs and a Session ID that is from the client to identify videos to be sent to client devices. When the client receives the video data streams, the client uses the IDs to recognize that the received videos are related to particular online meeting and to identify each individual video.

According to an exemplary operation, a client device associates a participant ID with a respective one of the videos obtained by a camera (either in room or at the remote computing device), and sends them to Cloud Service 230. The Server 200 associates a virtual participant ID with each video obtained by network camera(s) of a meeting room, and send them to Cloud Service. The network camera(s) is not associated with a specific user. The online meeting system sends Video(s) and Participant ID(s) to Client in response to a request from the Client.

According to a start request for videos associated with Virtual Participant IDs from Client, Cloud Service (e.g. online meeting system) starts to send videos associated with virtual participant IDs to the Client which sends the request. Cloud Service sends, via a conventional meeting session, videos associated with Real Participant IDs, and sends, via another separate session (e.g. a server-specific session), videos associated with Virtual Participant IDs. The session ID of Server session is created at the time when Client issues the start request.

Client displays, within a first window for a conventional meeting, videos received from Cloud Service via Conventional meeting session and associated with Real Participant IDs. Client displays, within a second window, videos received from Cloud Service via Server session and associated with Virtual Participant IDs. Client does not distinguish Real Participant ID from Virtual participant ID. Client distinguishes a video of an Server system and a conventional meeting system by checking a session ID used to send the video. In another embodiment, all videos may be displayed within a single window.

In a further embodiment, the server also includes a dedicated display screen that can display, for the users at the predetermined location (e.g. office meeting room) video streams associated with the crop sections of the video captured by the image capture device at that location. In other embodiment, the display screen is a touch screen and allows for selectability of particular objects captured by the image capture device.

In another embodiment, the system may make use of metadata such as security level information that is used to determine, based on user level information for each Real Participant ID, if each corresponding vide can be transmitted to the client who requests that video. In a further embodiment, real participants at the location can set restrictions or preferences that would inhibit the server from providing video of themselves or an object of theirs to the client device. In this manner, the system can prevent the generation of Virtual IDs for one or more objects detected based on preferences of the a user.

Figure 7:
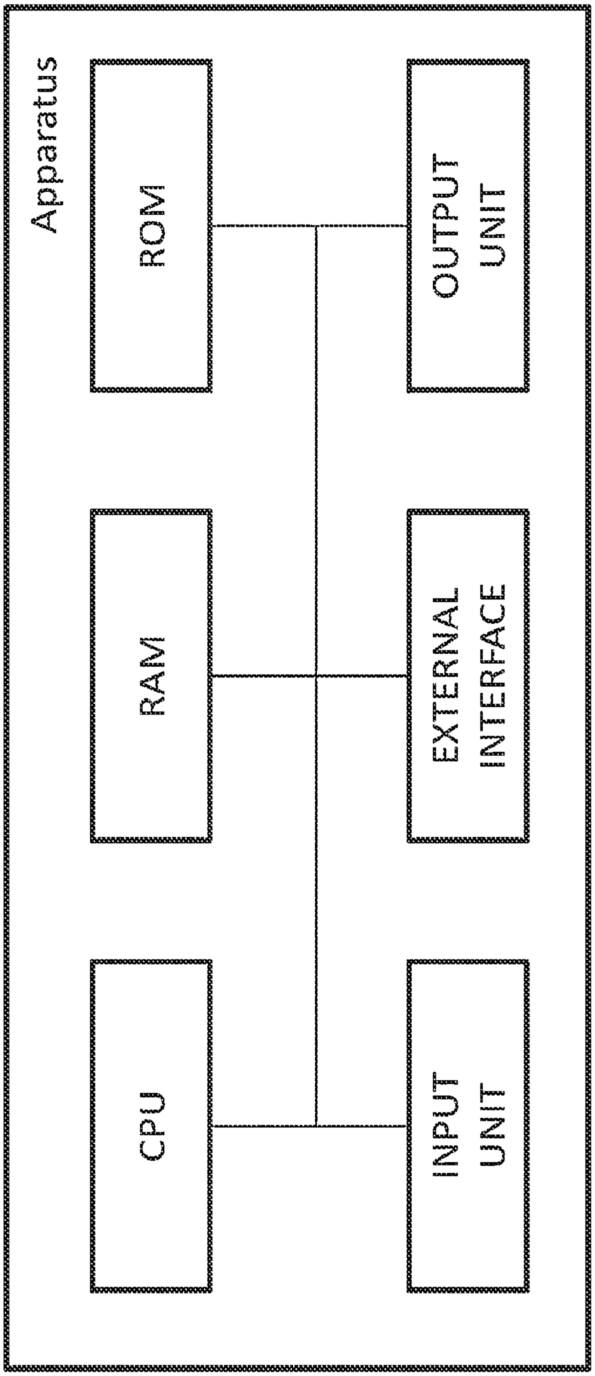
FIG. 7 is a block diagram detailing the hardware components of an apparatus that executes the algorithm according to the present disclosure.

FIG. 7 illustrates the hardware (computer) that represents any of the server, the cloud service and/or client device that can be used in implementing the above described disclosure. The apparatus includes a CPU, a RAM, a ROM, an input unit, an external interface, and an output unit. The CPU controls the apparatus by using a computer program (one or more series of stored instructions executable by the CPU) and data stored in the RAM or ROM. Here, the apparatus may include one or more dedicated hardware or a graphics processing unit (GPU), which is different from the CPU, and the GPU or the dedicated hardware may perform a part of the processes by the CPU. As an example of the dedicated hardware, there are an application specific integrated circuit (ASIC), a field-programmable gate array (FPGA), and a digital signal processor (DSP), and the like. The RAM temporarily stores the computer program or data read from the ROM, data supplied from outside via the external interface, and the like. The ROM stores the computer program and data which do not need to be modified and which can control the base operation of the apparatus. The input unit is composed of, for example, a joystick, a jog dial, a touch panel, a keyboard, a mouse, or the like, and receives user's operation, and inputs various instructions to the CPU. The external interface communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit is composed of, for example, a display unit such as a display and a sound output unit such as a speaker, and displays a graphical user interface (GUI) and outputs a guiding sound so that the user can operate the apparatus as needed.

In another embodiment, each video stream may have a security rank associated therewith such as High, Mid or Low. Each client device or attendee (client user) has access authority. Some attendee may have an access authority to access only low security level video stream. Another attendee may have an access authority to access low and mid-level video stream or may have access authority to access all levels of video streams. Based on a security level of a video stream and an access level of a client device or an attendee, the system can determine whether the video stream can be distributed each client/attendee respectively.

Figure 8:
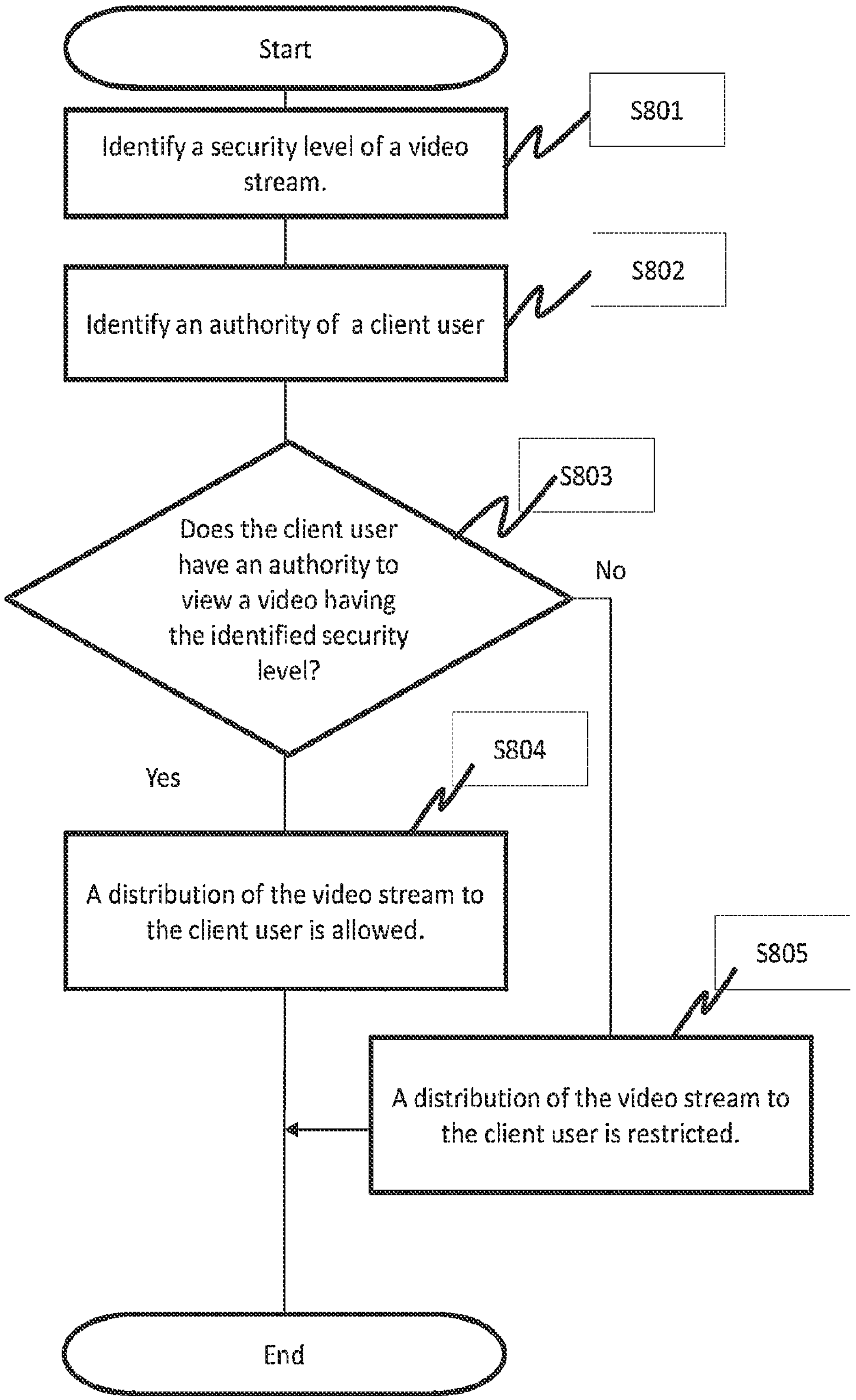
FIG. 8 is a flow diagram illustrating exemplary operation of the online meeting solution according to the present disclosure

FIG. 8 shows a flowchart of a distribution control of each video stream based on a security level of the video stream and a user authority. In this embodiment, a CPU (processor) of a computer shown in the FIG. 7 which performs each processing step described in FIG. 8 by executing a program (i.e. a set of instructions that are executable by a processing device such as a CPU) stored in the RAM or ROM in the FIG. 7.

In S801, the a security level of a video stream is identified. In this embodiment, metadata indicating security level is associated with a video stream and be used to identify the information of the security level by referring to the metadata included in or associated with the video stream. An administrator of the system may designate each security level of respective video stream in advance. Alternatively, the system may automatically determine the security level based on a content of the video stream. For example, if the system detects that an image of a specific user or a specific object is included in the video stream, the system may determine that the security level of the video stream is high. The system can detect that a video stream includes the specific person or a specific object, based on the participant ID or object ID of the video stream. Alternatively, the system may detect the specific person or the specific object by performing object detection processing and comparing the result of the object detection processing with a security store that has a security level associated with one or more objects or persons which can then be used to append metadata having the requisite security level to the video stream In S802, an authority of a user is identified by checking an authorization store that is present in the memory of the device which identifies what video streams are viewable by the client at the remote device. In step S803, it is determined whether the video stream having the identified security level is allowed to be distributed to a client user having the identified authority. If the client user has an authority to view the video stream having the identified security level, then the computer allows to distribute the video stream to the client user (S804). If the client user does not have the authority to view the video stream having the identified security level, then the computer restricts (or prohibits) a distribution of the video stream to the client user (S805).

In a further embodiment, real participants at the location can set restrictions or preferences that would inhibit the server from providing video of themselves or an object of theirs to the client device. In this manner, the system can prevent the generation of Virtual IDs for one or more objects detected based on preferences of a user.

In a further embodiment, information (metadata) indicating a distribution range of a video stream may be associated with a video stream. For example, video streams are classified into an internal video stream or an external video stream. External video stream is a video stream that is allowed to distribute to the client outside of the conference room. On the other hand, internal video stream is a video stream that is not allowed to distribute to a client outside of the conference room. A user can relate the information of "External" or "Internal" to each video streams or a system may automatically relate "External" or "Internal" to a video stream according to a predetermined rule. Alternatively, the system may automatically determine the classification information based on a content of the video stream. For example, if the system detects that an image of a specific user or a specific object is included in the video stream, the system may determine that the classification of the video stream is "internal". The system can detect that a video stream includes the specific person or a specific object, based on the participant ID or object ID of the video stream. Alternatively, the system may detect the specific person or the specific object by an image processing.

Figure 9:
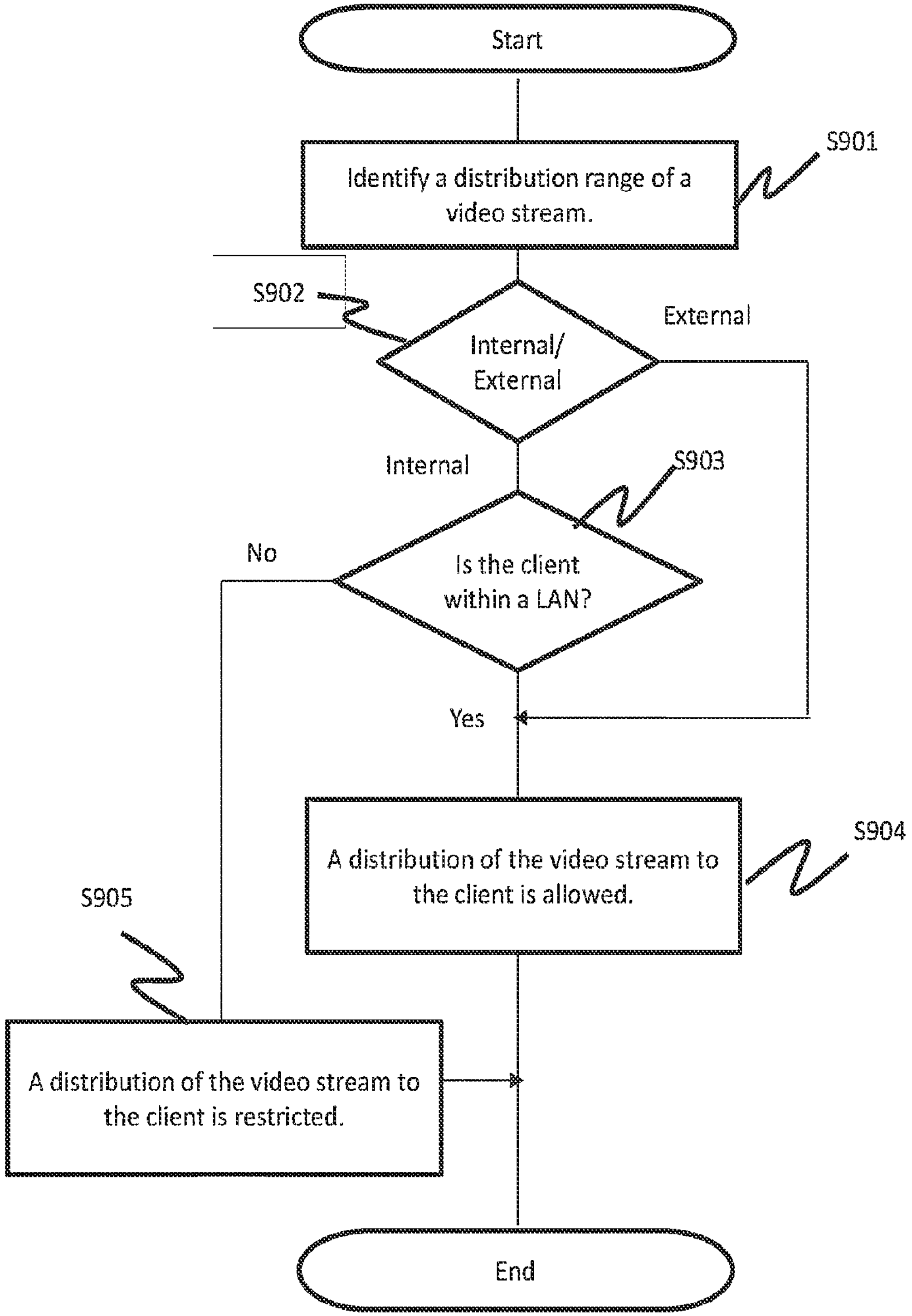
FIG. 9 is a flow diagram illustrating exemplary operation of the online meeting solution according to the present disclosure.

FIG. 9 shows a flowchart of a distribution control of each video stream based on a security level of the video stream and a user authority. In this embodiment, a CPU (processor) of a computer shown in the FIG. 7 which performs each processing step described in FIG. 8 by executing a program (i.e. a set of instructions that are executable by a processing device such as a CPU) stored in the RAM or ROM in the FIG. 7.

In step S901, a distribution range of a video stream is identified by obtaining, from the video stream, classification information associated therewith as one of "External" or "Internal". In this embodiment, metadata indicating the classification information is associated with a video stream. The computer can identify the classification information by referring to the metadata included in or associated with the video stream.

In step S902, the computer determines whether the video stream has "External" classification or "Internal" classification. If the video stream has "External" classification, the computer allows to distribute the video stream to a client device (S904).

If the video stream has "Internal" classification, the computer determines whether the client is within the internal network (S903). The internal network may be LAN (Local Area Network). For example, the system can identify the location of the client based on its IP address.

If it is determined that the client is within the internal network, then the computer allows to distribute the video stream to a client device (S904). If it is determined that the client is out of the internal network, then the computer restricts or prohibits to distribute the video stream to the client (S905).

Figure 10:
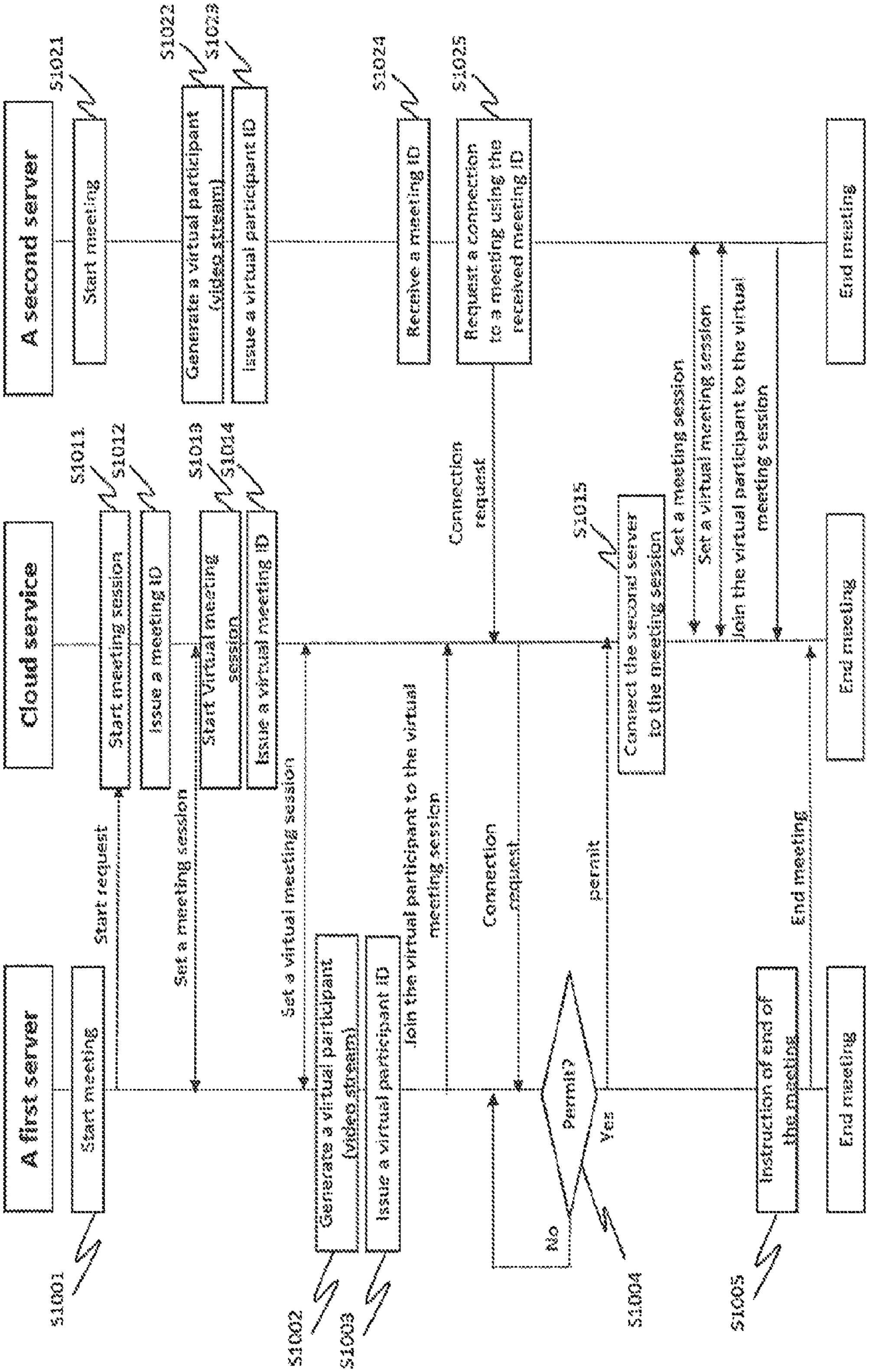
FIG. 10 is a sequence diagram illustrating exemplary operation of the online meeting solution according to the present disclosure Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

FIG. 10 illustrates a sequence whereby a second meeting room seeks to join the online meeting of a first meeting room In S1001, a first server in a first location starts a meeting. The first sever sends a start request of the meeting to a cloud service. In S1011, the cloud service starts a meeting session. The cloud service issues a meeting ID in S1012. Alternatively, the meeting ID may be generated by the first server and may send to the cloud service. In a case were the cloud service starts the meeting session, the first server and the cloud service are connected via the meeting session (a meeting session is set). A video stream (a first video stream) of a captured image captured by a first camera connected to the first server is sent, via the meeting session, from the first server to the cloud service.

In S1013, the cloud service starts a virtual meeting session. The cloud service issues a virtual meeting ID in S1014. Alternatively, the virtual meeting ID may be generated by the first server and may be sent to the cloud service. The issued virtual meeting ID is associated with the meeting ID issued in S1012. Once the virtual meeting ID is issued, the first server and the cloud service are connected via virtual meeting session (a virtual meeting session is set). For example, the cloud service sends the generated virtual meeting ID and the first server lets the virtual participant join in the virtual meeting based on the virtual meeting ID. A video stream (a second video stream) of a part of the captured image captured by the first camera is sent, via the virtual meeting session, from the first server to the cloud service.

Turning now, to S1002, the first server generates a virtual participant. For example, the virtual participant derived by cropping a part of the captured image by a first camera but virtually the first server assigns a virtual participant ID to the cropped image and treats the cropped image as if it is captured by a second different camera which, in fact, does not exist. Each virtual participant is a different image source derived from the image actually being captured by the camera. By issuing a virtual participant ID to the second image source (S1003), a user recognizes the cropped image as if it is captured by a second camera. If the virtual participant ID is issued, the first server requests the cloud server to join the virtual participant to the virtual meeting session.

On the other hand, the second server starts a meeting in S1021. In S1022, the second server generates a virtual participant and in S1023, the second server issues a virtual participant ID. In S1024, the second server receives a meeting ID. A user may input the meeting ID to the second server or the first server may send the meeting ID to the second server.

If the meeting ID is received and a joining of the meeting having the meeting ID is instructed, the second server request to join the meeting having the meeting ID.

The cloud service receives the request and forwards it to the first server. In S 1004, the first server determines whether or not the first server permits the request. The determination may be done based on a input from a user of the first server. Alternatively, the determination may be done automatically.

For example, the first server stores a secret PIN code in advance and if the same PIN code is received from the second server, the first server replies to the cloud service to allow the second server to join in the meeting. Alternatively, the first server may perform authentication based on an ID of the second server like IP address, MAC address or other unique ID of the second server or unique ID of a participant of the meeting held by the second server. The determination in S1004 may be done by cloud service instead of the first server.

Once the joining of the second server is permitted, the cloud service connects the second server to the meeting session (S1015). A video stream (a third video stream) of a captured image captured by a second camera connected to the second server is sent, via the meeting session, from the second server to the cloud service.

After the second server is connected via the meeting session, the second server is connected to the cloud service via a virtual meeting session (a virtual meeting session is set). For example, the cloud service sends the generated virtual meeting ID to the second server and the second server let its virtual participant join in the virtual meeting based on the virtual meeting ID. A video stream (a fourth video stream) of a part of the captured image captured by the second camera is sent, via the meeting session, from the second server to the cloud service.

In this way, the video stream from a virtual participant of the first server can be shared with the second server and the video stream from a virtual participant of the second server can be shared with the first server.

Alternatively, new virtual meeting ID may be generated for the second server. The new virtual meeting ID is associated with the meeting ID issued in S1012. As the virtual meeting ID issued in S1014 and the meeting ID issued in S1012 are associated each other and the new virtual meeting ID is associated and the meeting ID issued in S1012 are associated each other, the video stream from a virtual participant of the first server can be shared with the second server and the video stream from a virtual participant of the second server can be shared with the first server.

In S1005, the first server instructs an end of the meeting to the cloud service. The cloud service ends the meeting in accordance with the instruction and the meeting session and the virtual meeting sessions end.

As described above, a meeting between multiple servers are realized. Especially, according to the system, each server generates virtual participants and the servers can share the video streams of the virtual participants between the servers.

The scope of the present disclosure includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. An apparatus configured to connect to a first server and second server via an online meeting, the apparatus comprising:

one or more processors; and one or more memories storing instructions that, when executed, configures the one or more processors, to:

receive a first video stream of a captured image captured by a first camera connected to the first server and assign, to the received first video stream, a first participant ID associated with a meeting session between the first server and the apparatus;

receive, as a second video stream, a part of the captured image captured by the first camera and assign a first virtual participant ID associated with the meeting session to the second video stream;

receive, a third video stream of captured images captured by a second camera connected to the second server, and assign, to the received third video stream, a second participant ID associated with the meeting session;

receive, as a fourth video stream, a part of the captured image captured by the second camera and assign a second virtual participant ID associated with the meeting session to the fourth video stream; and establish a connection between the first server and the second server via the meeting session such that first and second video streams are provided to the second server using the assigned first participant ID and first virtual participant ID and third and fourth video streams are provided to the first server using second participant ID and second virtual participant ID.

2. The apparatus according to the claim 1, wherein the instructions, when executed, configures the one or more processors, to:

set the meeting session, wherein the first video stream is sent, via the meeting session, from the first server to the apparatus; and set a first virtual meeting session associated with the meeting session, wherein the second video stream is sent, via the first virtual meeting session, from the first server to the apparatus.

3. The apparatus according to the claim 1, wherein the instructions, when executed, configures the one or more processors, to:

receive, from the second server, a connection request;

set the meeting session with the second server and a second virtual meeting session associated with the meeting session with the second server, in a case where a connection is permitted in response to the connection request, wherein the third video stream is sent via the meeting session and the fourth video stream is sent via the second virtual meeting session.

4. The apparatus according to the claim 3, wherein the instructions, when executed, configures the one or more processors, to:

forward the received connection request to the first server, wherein the meeting session with the second server and second virtual meeting session with the second server are set, in a case where a connection is permitted by the first server in response to the connection request.

5. A method of controlling an apparatus configured to connect to a first server and second server via an online meeting, the method comprising:

receiving a first video stream of a captured image captured by a first camera connected to the first server and assigning, to the received first video stream, a first participant ID associated with a meeting session between the first server and the apparatus;

receiving, as a second video stream, a part of the captured image captured by the first camera and assigning a first virtual participant ID associated with the meeting session to the second video stream;

receiving, a third video stream of captured images captured by a second camera connected to the second server, and assigning, to the received third video stream, a second participant ID associated with the meeting session;

receiving, as a fourth video stream, a part of the captured image captured by the second camera and assigning a second virtual participant ID associated with the meeting session to the fourth video stream; and establishing a connection between the first server and the second server via the meeting session such that first and second video streams are provided to the second server using the assigned first participant ID and first virtual participant ID and third and fourth video streams are provided to the first server using second participant ID and second virtual participant ID.

6. The method according to the claim 5, further comprising setting the meeting session, wherein the first video stream is sent, via the meeting session, from the first server to the apparatus; and setting the first virtual meeting session associated with the meeting session, wherein the second video stream is sent, via the first virtual meeting session, from the first server to the apparatus.

7. The method according to the claim 5, further comprising receiving, from the second server, a connection request;

setting the meeting session with the second server and a second virtual meeting session associated the meeting session with the second server, in a case where a connection is permitted in response to the connection request, wherein the third video stream is sent via the meeting session and the fourth video stream is sent via the second virtual meeting session.

8. The apparatus according to the claim 7, further comprising:

forwarding the received connection request to the first server, wherein the meeting session with the second server and second virtual meeting session with the second server are set, in a case where a connection is permitted by the first server in response to the connection request.

* * * * *